Patented June 3, 1952

UNITED STATES PATENT OFFICE 2,599,497

BASIC STILBENE DERIVATIVES

Willy Stoll, Basel, and Charles J. Morel, Arlesheim, Basel-Land, Switzerland, assignors to J. R. Geigy A. G., Basel, Switzerland, a Swiss firm No Drawing. Application November 16, 1950, Serial No. 196,078. In Switzerland December 5, 1949

3 Claims. (Cl. 260—570.8)

The present invention is concerned with the production of new basic stilbene derivatives of the formula:

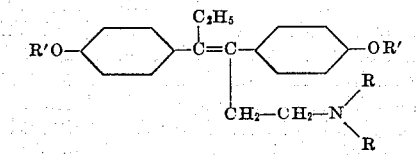
I wherein R represents lower alkyl radicals, or both R's together with the nitrogen atom represent a piperidino radical, and R' represents lower alkyl or benzyl radicals. These compounds can be produced by reacting aminoalkyl substituted desoxybenzoins of the general formula:

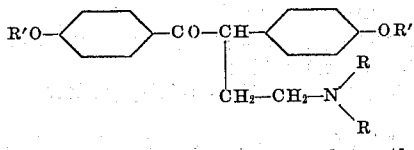
II with organic metal ethyl compounds of the formula:

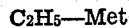

wherein Met represents a reactive metal atom such as lithium or a reactive metal halogen group such as Mg-halogen and finally decomposing to form hydroxy compounds of the general formula:

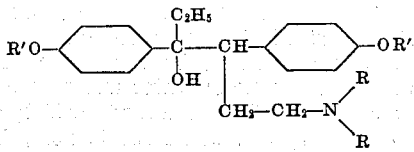
III and dehydrating.

The Grignard compounds

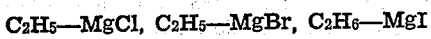

which can be reacted with carbonyl compounds in ethers such as diethyl ether or also dibutyl ether, are particularly suitable as organic metal ethyl compounds. Ethyl lithium can also be reacted in the same solvents.

Dehydration can be performed with all the usual agents for the conversion of tertiary alcohols into unsaturated compounds, e. g.: mineral acids such as sulphuric acid, phosphoric acid, hydrogen chloride; anhydrides such as phosphorus pentoxide or aluminum oxide; salts such as potassium hydrogen sulphate, zinc chloride, boron phosphate, aluminum phosphate or chromium phosphate; organic acids and their anhydrides such as formic acid, acetic acid, oxalic acid, glycolic acid, phthalic acid anhydride; iodine, or mixtures of such agents such as acetic anhydride+zinc chloride, acetic anhydride+conc. sulphuric acid.

Dehydration may also be performed by using agents or conditions either at the same time or in succession which first convert the hydroxyl group into an ester group and then split off the acid, e. g. treatment with thionyl chloride and pyridine.

The starting products of the general formula:

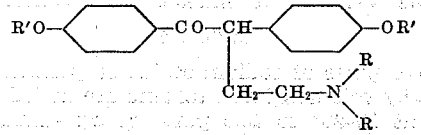

can be produced by reacting sodium compounds of p.p'-alkoxy substituted desoxybenzoins with N-disubstituted aminoethyl halides. Alkyl radicals with 1-4C atoms are most suitable as the low alkyl radicals R and R'. p.p'-Dimethoxy-, p.p'diethoxy-, p.p'-dipropoxy-, p.p'-di-isopropoxy-, p.p'-dibutoxy-, p.p'-di-isobutoxy-, and p.p'-dibenzyloxy-desoxybenzoin come into consideration as desoxybenzoins. Their sodium compounds can be reacted with, for example, β-dimethylamino-, β-diethylamino-, β-dipropylamino-, β-dibutylamino-, β-di-isobutylamino-, β-methyl-ethylamino-, β-methyl-isopropylamino-, β-(methyl-sec. butylamino)-, β-methyl-butylamino-, β-piperidino-, β-pyrrolidino-, or β-morpholino-ethyl chloride or bromide.

The compounds of the general formula:

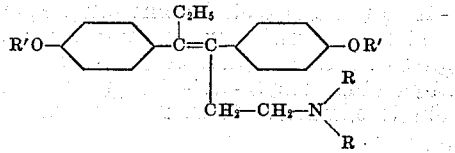
I can be converted into dihydroxy compounds of the general formula:

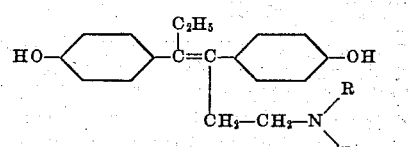
IV by treatment with the usual agents for splitting phenol ethers such as alcoholic potash lye at a raised temperature or hydrobromic acid. They form easily soluble salts with acids and lyes in water.

The p.p'-dialkoxy-α-ethyl-β-dialkylamino ethyl stilbenes are strong bases which are practically insoluble in water. With inorganic and organic acids they form water soluble salts, some of which easily crystallise. These acids are such as are generally used for the production of salts for therapeutical use, e. g. hydrochloric acid, sulphuric acid, hydrobromic acid, phosphoric acid, acetic acid, citric acid, lactic acid, malic acid, mucic acid, succinic acid, maleic acid, methylene di-salicylic acid, methane sulphonic acid, ethane disulphonic acid. In addition they form easily water soluble quaternary salts by the addition of reactive esters of aliphatic and araliphatic alcohols such as alkyl chlorides, bromides and iodides; dialkyl sulphates or aralkyl chlorides, bromides and iodides, e. g. ethyl bromide, allyl bromide, dimethyl sulphate or benzyl chloride.

Due to their physiological properties and, among others, their estrogenic activity, the new compounds are of therapeutical interest. They are distinguished from other estrogenically active stilbene derivatives by the presence of a water solubilising group.

The following example serves to illustrate the invention. The temperatures are given in degrees centigrade. Where not otherwise stated, parts are always given as parts by weight and the relationship of parts by weight to parts by volume is that of grammes to cubic centimetres.

*Example*

(a) 4 parts of sodium amide suspended in 12 parts by volume of abs. toluene are added dropwise at 10-20° to 25.6 parts of p.p'-dimethoxy desoxybenzoin in 100 parts by volume of abs. toluene. The whole is then boiled under reflux for 2 hours during which time a stream of nitrogen is slowly passed through. The mixture is then cooled to 85° and 12 parts of dimethylamino ethyl chloride are added dropwise at this temperature. It is then boiled for 16 hours under reflux. After cooling, the reaction product is shaken out with 200 parts by volume of 2n hydrochloric acid applied in two portions. The acid solution is washed with ether, made alkaline with a concentrated ammonia solution, ethered out and the ether solution is dried over sodium sulphate. After distilling off the ether, the residue is distilled in a high vacuum. α-(β'-dimethylamino ethyl)-p.p'-dimethoxy desoxybenzoin passes over at 220-222° at 0.9 mm. pressure as a highly viscous oil.

If 15 parts of diethylamino ethyl chloride are used in an analogous manner instead of 12 parts of dimethylamino ethyl chloride, α-(β'-diethylamino ethyl)-p.p'-dimethoxy desoxybenzoin is obtained. B. P. 201-202° at 0.15 mm. pressure.

(b) The Grignard compound is produced from 12 parts of magnesium and 55 parts of ethyl bromide in 500 parts by volume of abs. ether. 32.7 parts of the ketone obtained as described above in 50 parts by volume of abs. ether are added dropwise in such a way that the ether gently boils under reflux. The whole is then boiled for a further 2 hours under reflux, then cooled, the reaction product is broken down with ice and hydrochloric acid and the base is extracted at the same time. Neutral components in the acid solution are removed with ether and a little solid ammonium chloride is added to the acid solution. It is then made alkaline with conc. ammonia solution, ethered out and the ether solution is dried over sodium sulphate. On distilling off the ether, a highly viscous oil remains which congeals after standing for a long time. It is advantageous to work further with the raw product. 1-dimethylamino-3.4-di-p-anisyl-4-hydroxyhexane when recrystallised from ether-petroleum ether melts at 105-106°.

If 35.5 parts of α-diethylamino ethyl-p.p'-dimethoxybenzoin are used in a similar manner instead of the above ketone, 1-diethylamino-3.4-di-p-anisyl-4-hydroxyhexane is obtained.

(c) 20 parts of the above raw product are well mixed with 35 parts of potassium hydrogen sulphate and then the mixture is heated for 30 minutes at 180-200° and then for 5 minutes at 220°. After cooling, the reaction mixture is dissolved in diluted hydrochloric acid, the neutral components in the acid solution are removed with ether and finally the acid solution is made alkaline with conc. ammonia solution. The base, which precipitates is taken up in ether, the ether solution is dried over sodium sulphate, the ether is evaporated off and the residue is rectified in a high vacuum. p.p'-methoxy-α-ethyl-β-(β'-dimethylamino ethyl)-stilbene passes over at 174-175° at 0.05 mm. pressure. The base is easily and completely dissolved in dilute mineral acids.

If 1-diethylamino-3.4-di-p-anisyl-4-hydroxyhexane is used instead of the above hydroxy compound, p.p'-dimethoxy-α-ethyl-β-(β'-diethylamino ethyl)-stilbene is obtained as a highly viscous oil which boils at 191-192° at 0.35 mm. pressure.

The following compounds can be produced in an analogous manner:

p.p'-Diethoxy-α-ethyl-β-(β'-dimethylamino ethyl)-stilbene, p.p'-Dimethoxy-α-ethyl-β-(β'-piperidino ethyl)-stilbene, p.p'-Dimethoxy-α-ethyl-β-(β'-dibutylamino ethyl)-stilbene, p.p'-Di-isopropoxy-α-ethyl-β-(β'-dimethylamino ethyl)-stilbene, p.p'-Dibenzyloxy-α-ethyl-β-(β'-dimethylamino ethyl)-stilbene.

(d) 10.2 parts of p.p'-dimethoxy-α-ethyl-β-(β'-dimethylamino ethyl)-stilbene are heated in the autoclave for 24 hours at 180-190° with 40 parts of potassium hydroxide and 80 parts by volume of alcohol to split off the ether groups. After cooling, the mixture is diluted with an equal volume of water and filtered with animal charcoal. It is then made acid to Congo red paper with conc. hydrochloric acid, filtered hot with animal charcoal and then made alkaline with conc. soda solution. After ethering out, the ether solution is dried over sodium sulphate and the ether is distilled off.

p.p'-Dimethoxy-α-ethyl-β-(β'-diethylamino ethyl)-stilbene can be converted into the corresponding raw p.p'-dihydroxy compound in the same manner. These compounds are completely soluble in acids and lyes.

p.p'-Dihydroxy-α-ethyl-β-(β'-piperidino ethyl)-stilbene and p.p'-dihydroxy-α-ethyl-β-(β'-dibutylamino ethyl)-stilbene are obtained by splitting the further ether named under (c).

What we claim is:

1. As a new compound a member selected from the group consisting of a basically substituted derivative of p.p'-dihydroxystilbene and its water soluble acid addition salts, said basically substituted derivative of p.p'-dihydroxystilbene having the general formula:

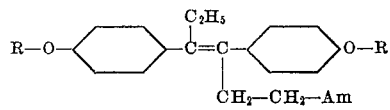

wherein Am represents a member selected from the group consisting of di-(lower alkyl)-amino radicals and the piperidino radical and R represents a member selected from the group consisting of lower alkyl and benzyl radicals.

2. As a new compound a member selected from the group consisting of a basically substituted derivative of p.p'-dihydroxystilbene and its water soluble acid addition salts, said basically substituted derivative of p.p'-dihydroxystilbene having the general formula:

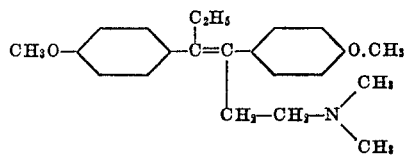

3. As a new compound a member selected from the group consisting of a basically substituted derivative of p.p'-dihydroxystilbene and its water soluble acid addition salts, said basically substituted derivative of p.p'-dihydroxystilbene having the general formula:

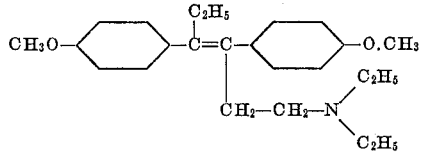

WILLY STOLL.
CHARLES J. MOREL.

No references cited.